(12) United States Patent
Ndiaye et al.

(10) Patent No.: US 10,776,536 B2
(45) Date of Patent: Sep. 15, 2020

(54) METHOD FOR GENERATING A PETRI NET SIMULATION MODEL OF AN INDUSTRIAL CONTROL SYSTEM

(71) Applicant: Schneider Electric Industries SAS, Rueil-Malmaison (FR)

(72) Inventors: Moulaye Ndiaye, Nice (FR); Jacques Camerini, Roquefort les Pins (FR); Jean-Francois Petin, Villers-les-Nancy (FR); Jean-Philippe Georges, Laxou (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 654 days.

(21) Appl. No.: 15/499,059

(22) Filed: Apr. 27, 2017

(65) Prior Publication Data
US 2017/0316129 A1    Nov. 2, 2017

(30) Foreign Application Priority Data

Apr. 28, 2016   (EP) .................................. 16305489

(51) Int. Cl.
G06F 30/20       (2020.01)
G06F 30/22       (2020.01)
G06F 111/10      (2020.01)

(52) U.S. Cl.
CPC .............. *G06F 30/20* (2020.01); *G06F 30/22* (2020.01); *G06F 2111/10* (2020.01)

(58) Field of Classification Search
CPC ............. G06F 17/5009; G06F 17/5013; G06F 2217/16
See application file for complete search history.

(56) References Cited

U.S. PATENT DOCUMENTS

2009/0094575 A1*   4/2009   Vieira ...................... G06F 8/10
                                                               717/104

OTHER PUBLICATIONS

European Search Report (with Written Opinion) dated Oct. 19, 2016 in European Application 16305489.3 filed on Apr. 28, 2016.
(Continued)

*Primary Examiner* — Saif A Alhija
(74) *Attorney, Agent, or Firm* — Oblon, McClelland, Maier & Neustadt, L.L.P.

(57) ABSTRACT

A computer implemented method generates a Petri Net simulation model of an industrial controls system. The method includes providing a basic Petri Net system model employing a generic component model. The system model has at least two component places for generating parameterisation tokens, at least two family places for generating component instantiation tokens, and an architecture place for generating family instantiation tokens for the family place in response to an initial token. The method further includes providing a component family library including component family data, providing a component parameter list including component parameter data for each individual component of the Industrial Control System. Furthermore, the method includes assigning a unique identifier to each component of the component parameter list, assigning each component present in the component parameter list to one component family, and instantiating the basic Petri Net model by processing the component parameter list.

12 Claims, 8 Drawing Sheets

(56) References Cited

OTHER PUBLICATIONS

Shih Sen Peng, et al., "Ladder Diagram and Petri-Net-Based Discrete-Event Control Design Methods", IEEE Transactions on Systems, Man, and Cybernetics-Part C: Applications and Reviews, vol. 34, (4), 2004, 9 pgs.

A. Taholakian, et al., "PN PLC: A methodology for designing, simulating and coding PLC based control systems using Petri nets", International Journal of Production Research, vol. 35, (6), 1997, 20 pgs.

C. Jorns, et al., "Hybrid Modelling with Petri Nets for the Verification of Logic Control Algorithms", Proceedings of $3^{rd}$ European Control Conference, vol. 3, 1995, 7 pgs.

\* cited by examiner

METHOD FOR GENERATING A PETRI NET SIMULATION MODEL OF AN INDUSTRIAL CONTROL SYSTEM

The present invention relates to performance assessment of industrial control systems by means of Petri Nets, and more particular to automatically generating a Petri Nets model of an industrial control system.

BACKGROUND

Industrial control systems are designed using hardware and software components for the purpose of automated monitoring and controlling of industrial machinery executing an automated factory process. Such an Industrial Control System 1, for example as shown in FIG. 1, generally has as at least one Programmable Logic Controller (PLC) 2, one or more clients 3, 4 and multiple devices 5, 6, 7 all connected through a Communication Network 8. Performance assessment of such an industrial control system to optimize the system is preferably done prior to investing and building of the control system. Such performance assessment requires the development of a model of the industrial control system. The main indicator for performance assessment is the time delay between components, in particular the end-to-end delay for a message to go from a device sending the message to a device intended to receive the message. One approach involves evaluation of analytic models that compute the time delay of all components and define a temporal performance in terms of maximum time delay between components. Another approach is the simulation of a state space model, such as a Coloured Petri Net model. In a coloured Petri Net, the tokens of a Petri Net may be assigned a value or a set of values, which is referred to as a colour.

The modelling of an industrial control system (ICS) using Petri Nets requires an expert to manually model all components of an ICS architecture. Whether a new architecture is designed or an existing architecture is modified, for each modification a new Petri Net model needs to be built. This is because the Petri Nets formalism requires a specific structure and specific token colours based on the defined architecture.

Furthermore, for increasing complex ICS architecture it becomes very difficult to build a model. Moreover, a slight modification in ICS architecture is not easily carried over in the model: it cannot be readily adapted to reflect a modification in the ICS. This is regardless of whether the modification relates to the ICS architecture or to the configuration of parameters.

SUMMARY OF INVENTION

It is an object of the invention to provide a method of modelling that alleviates the drawbacks of the prior art.

According to one aspect, the invention relates to a method for providing a simulation model of an Industrial Controls System (ICS).

Despite the above mentioned difficulties of modifying and/or adapting an already build model of an ICS to reflect changes or modifications therein, providing a generic model of an ICS has been proven by the inventor(s) to benefit repetitive re-design of a Petri Net simulation model. This is possible, as the initial marking of the Petri Net, i.e. the generation of initialisation tokens in the places across the generic Petri Net model according to the invention allows initial configuration and parameterization steps prior to performing simulation. In this manner, the generic model may be instantiated and initialized to represent a specific configuration of an ICS architecture. And, hence, adapting the model to reflect changes in the ICS architecture can be readily made.

In another aspect, there is provided a generic model of an Industrial Control System (ICS) which is suitable to be re-computed automatically.

BRIEF DESCRIPTION OF THE DRAWINGS

By way of example only, the embodiments of the present disclosure will be described with reference to the accompanying drawing, wherein.

DETAILED DESCRIPTION

The invention relates to a computer implemented method for generating a Petri Net simulation model of an industrial controls system (ICS). Tools for performing simulation using Petri Nets are commonly available.

Figure 2:
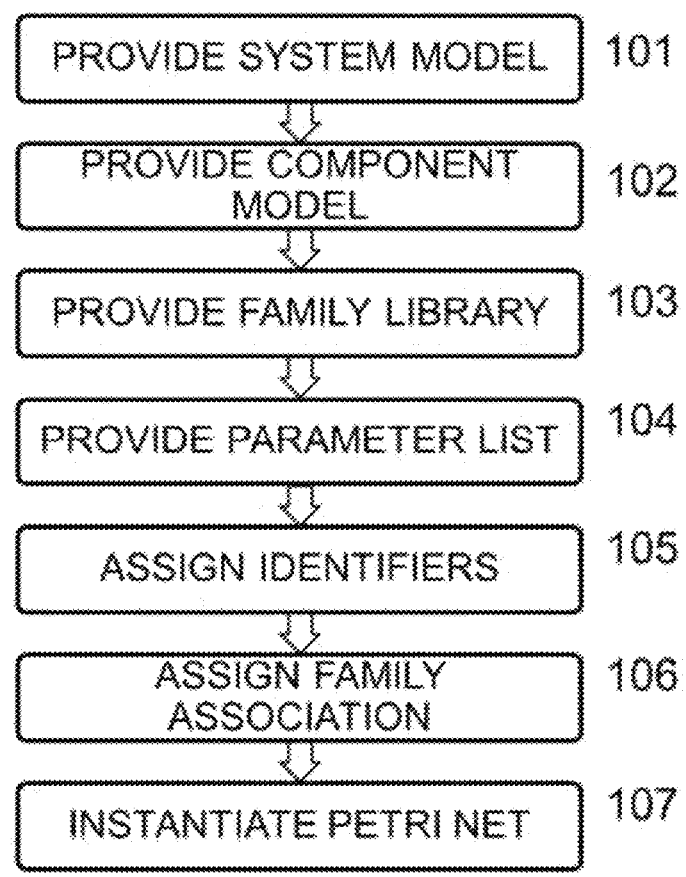
FIG. 2 shows an example of a method in accordance with the invention.
Figure 3:
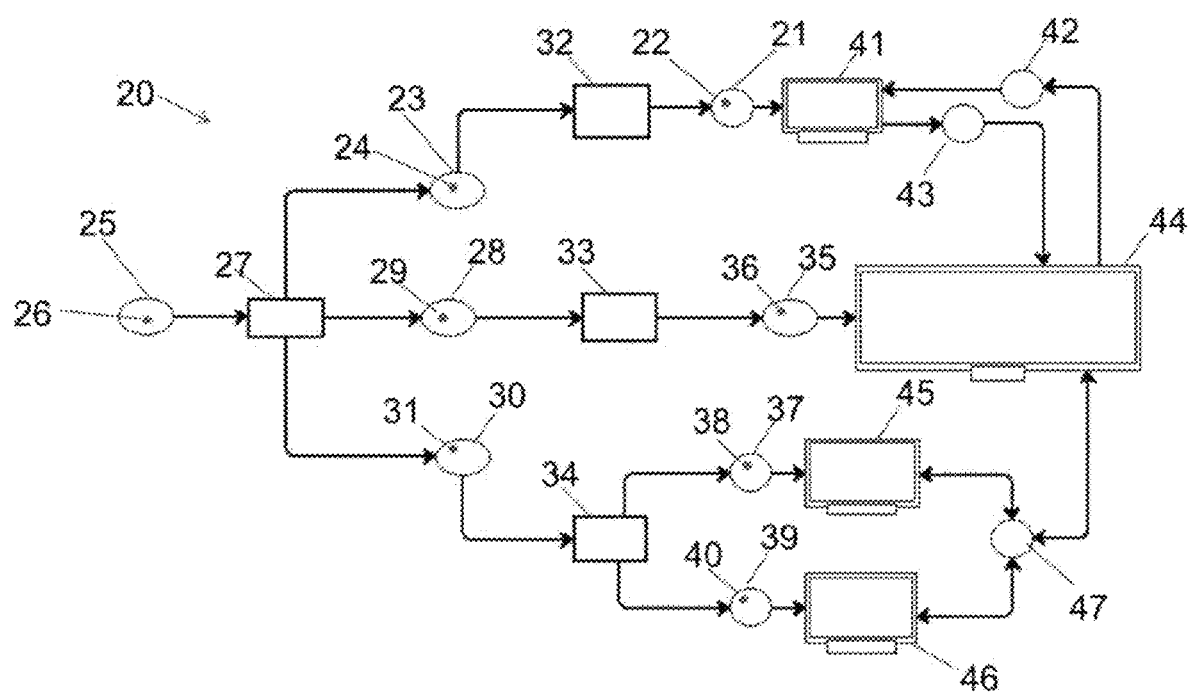
FIG. 3 schematically illustrates an example of a Petri Net system model in accordance with the invention.

Referring to FIGS. 2 and 3, the method begins by providing 101 a basic Petri Net system model, which employs 102 a generic component model. This generic component model 50, shown in FIG. 4, may comprise a functional block 51, an input place 52, an output place 53, a received message place 54 and a send message place 55. Further, there is an input buffer 56 connected between the received message place 54 and the input place 52, and an output buffer 57 connected between the send message place 55 and the output place 53. The generic component model is preferably implemented as a subpage of a superpage containing the basic system model.

The basic Petri Net system model 20, shown in FIG. 3, further has at least two component places 21, 35 for generating parameterisation tokens for the component model 41 in response to component instantiation tokens 22, 36. At least two family places 23, 28 for generating component instantiation tokens 22, 36 for the at least two component place 21, 35 in response to family instantiation tokens 24, 29. And an architecture place 25 for generating family instantiation tokens 24, 29 for the at least two family places 23, 28 in response to an initial blank token 26.

For use with the basic Petri Net system model a component family library is provided 103 which comprises component family data for at least a Network family, and for one or more of a SCADA family; a PLC family, and an I/O devices family. The component family data comprises for each component family a description of the functional behaviour to be substituted in the functional block of the generic component model. The component family data further comprises a set of default parameter values for each component family.

In addition, a component parameter list is provided 104 which comprises specific component parameter data for each individual component of the ICS.

The data contained by the component family library is developed and provided by a Petri Net expert. Whereas the component parameter list is derived from a design program used by an ICS-designer for designing an ICS. In this manner, the generic functional behaviour and default parameters of the components may be provided by a different source than the specific component parameters of the components of a certain ICS design.

The method further includes assigning 105 a unique identifier to each component present in the component parameter list. In order to associate each component with a component family, each component present in the component parameter list is assigned to one component family present in the component family library. Hence; a family association is assigned 106 to each component in the component parameter list These identifiers and family associations may be added to the parameter list or stored separately while keeping a link with each respective component in the list.

With the assigning of unique identifiers and family associations to the components of the component parameter list, it becomes possible to provide the different places of the Petri Net model with tokens. Therefore, the method further includes instantiating 107 the basic Petri Net model by processing the component parameter list.

Figure 4:
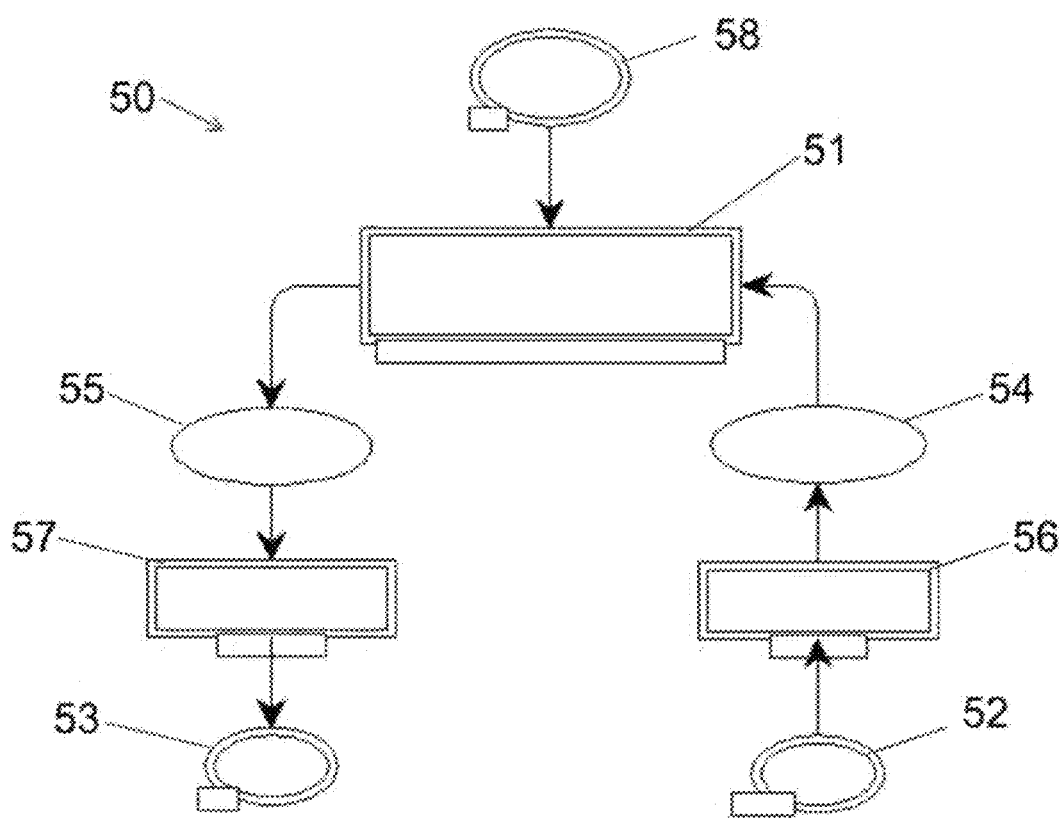
FIG. 4 schematically illustrates an example of a component model of the Petri Net system model in accordance with the invention.
Figure 5:
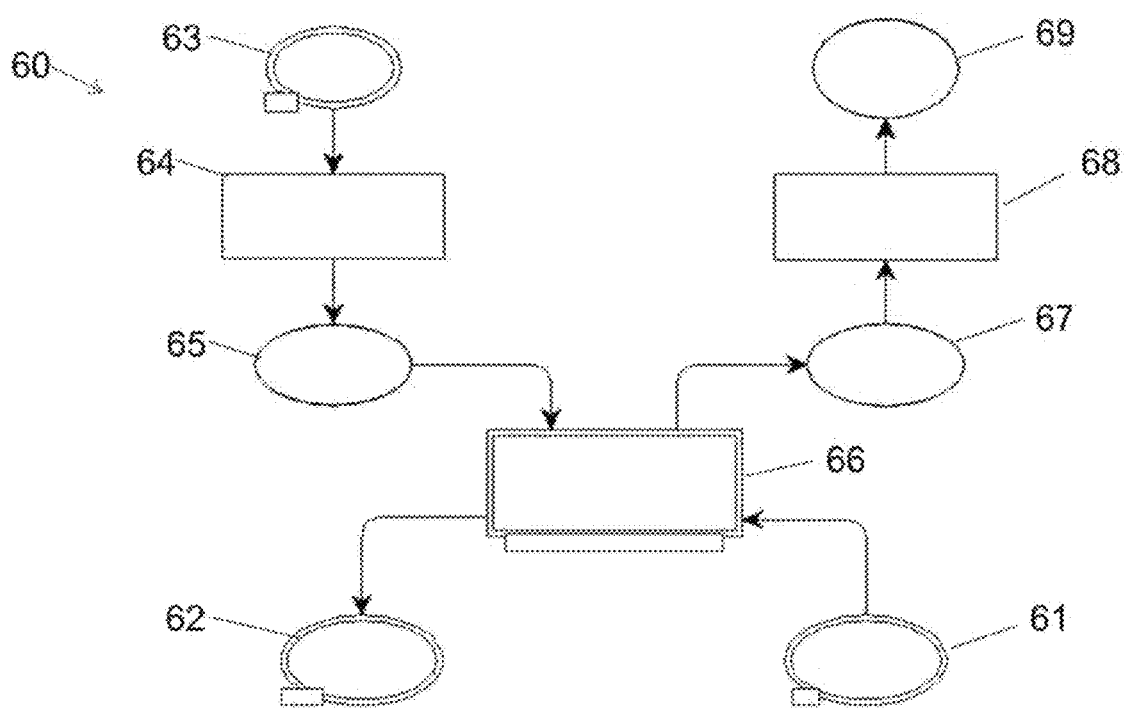
FIG. 5 schematically illustrates an example of a functional model of the component model in accordance with the invention.

Referring to FIG. 3, the structure of the basic Petri Net system model will be described in more detail. When the basic Petri Net system model is loaded and configured, a number of family places 23, 28, 30 is created corresponding to the number of families present in the component family library. As common with Petri Nets all places and transition are connected via arcs. The family places 23, 28, 30 are connected via arcs and a transition 27 to the architecture place 25. Each family place 23, 28, 30 in turn is connected respectively with at least one component place 21, 35, 37, 39 via a transition, and each component place 21, 35, 37, 39 is connected to a respective substitution transition 41, 44, 45, 46. The substitution transitions employ the generic component model, as shown in FIG. 4. The functional block of the generic component model as employed by each substitution transition is linked to a family place via the component place, and is configured according to the data content of the component family library for each respective family. Hence, the number of family places depends on the number of families for which a Petri Net expert has entered data into the component family library.

Furthermore, components of the same component family may be different in functional behaviour. For example, one PLC component may have an embedded Ethernet port, whereas another PLC component may have no Ethernet port but be connected to the I/O interface of the mounting rack. Hence, this results in a different functional behaviour for components of the same family. If this is the case, separate component places will be created linked to the same family place for the components having different functional behaviour.

Figure 1:
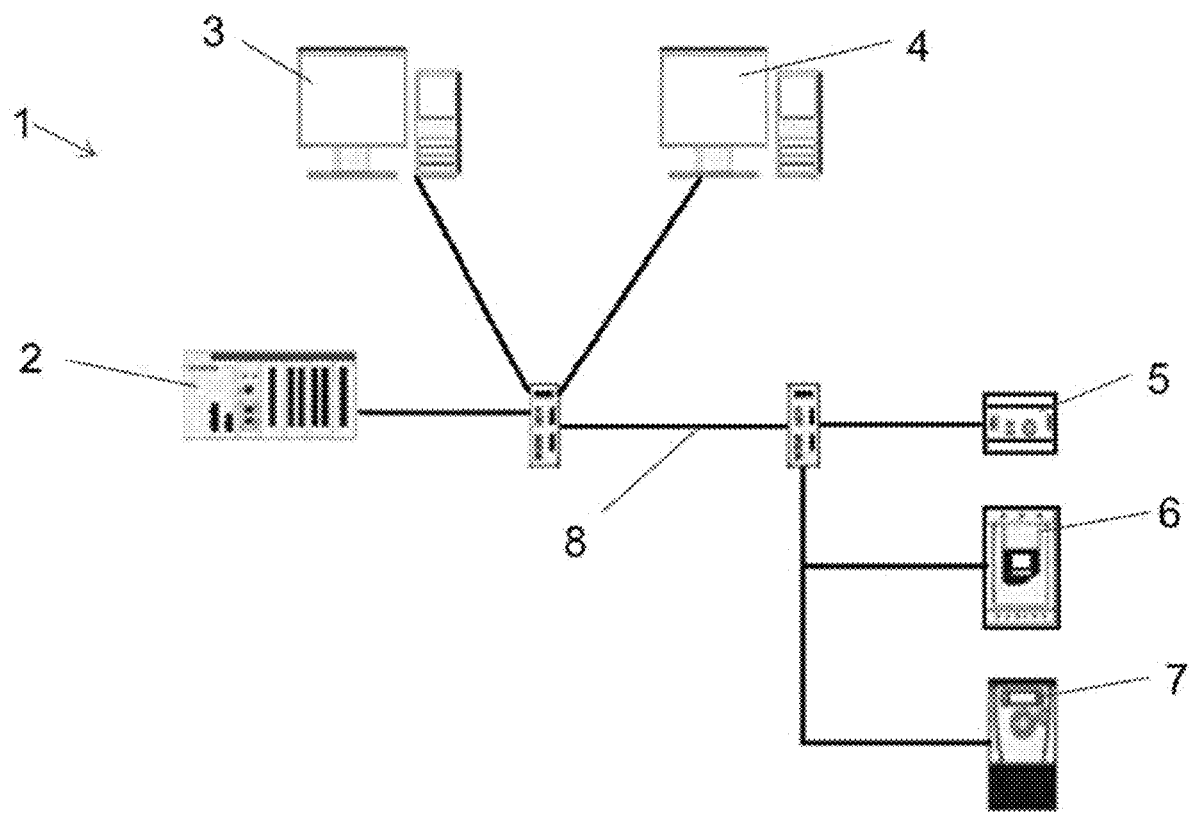
FIG. 1 schematically illustrates an example of an industrial control system.

Each ICS always has a communication network 8, as shown in FIG. 1. A corresponding family place 28 and component place 35 will thus at least be present in the Petri Net system model. As at least one device will be present in the ICS, a further family place 23 and component place will be present. In order to connect the Network and the device family, two communication places 42, 43 will be present for simulating the exchange of messages between components of this device family over the network. The communication places 42, 43 connect the substitution transition 44 of the network family and the substitution transition 41 of the device family. Similarly, when additional component families are present these are likewise connected to the substitution transition 44 of the network family via communication places. For example, as shown in FIG. 3 the substitution transition 45 of component 37 is connected via communication places, represented here for sake of simplicity as one bi-directional communication place 47, connected to the substitution transition 44 of the network family.

The example of the generic component model 50 as shown in FIG. 4, is implemented as a subpage of a hierarchical Petri Net. Accordingly, the component place 21 is a socket related with port component place 58, and the communication places 42, 43 are sockets related to port input place 52 and port outplace place 53 respectively. In addition, for each substitution transition the connected component place is a socket related to a port on a subpage and the connected communication places are sockets related to ports of that subpage. The subpage of the generic component model will be the same for all components of the component parameter list.

Figure 6:
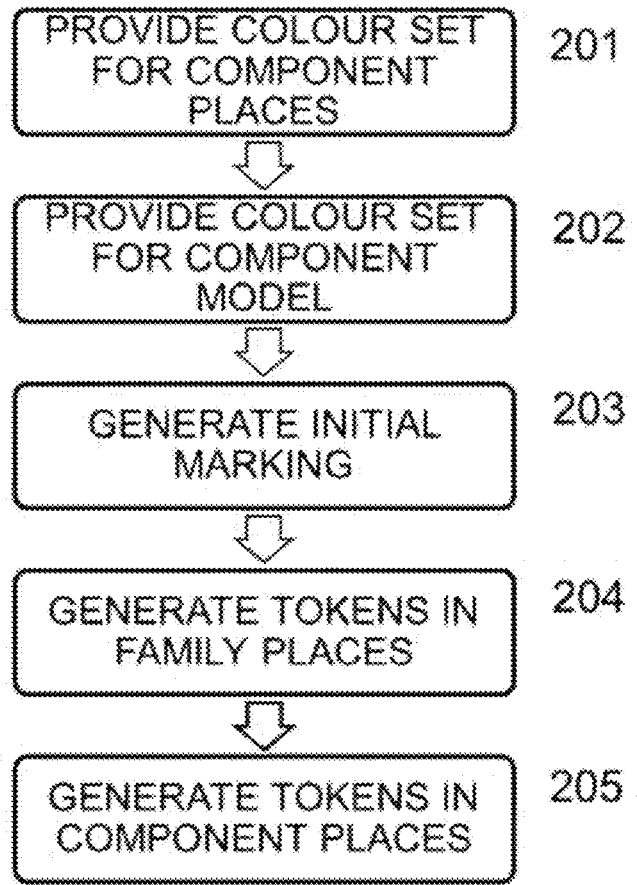
FIG. 6 shows an example of further parts of a method in accordance with the invention.

The generic component model 50 may in turn have a substitution transition which is implemented through the component place 58, the functional block 51, the received message place 54 and the send message place 55. Shown in FIG. 6 is a functional model 60; which allows simulating the processing of both incoming messages as messages generated self by a component itself, such as e.g; an error or fault message. The component place 58 of the generic model is in turn a socket of an initiate place port 63. The received message place 54 of the component model 50 is a socket related to port place 61 of the functional model 60 and the send message place 55 of the component model 50 is a socket related to port place 62 of the functional model 60. The functional model 60 further has a packet generator transition 64, a packet generator place 65, a behaviour transition 66, a end message place 67, an observer transition 68 and a communication end place 69.

The functional model 60 holds the information relating to the particular behaviour of component. For example, the packet generator transition 64 mimics the fact that any component can be the spontaneous emitting source of a message. As some components are designed to periodically sent messages, e.g. supported by a timed deterministic function associated to the output arc of "packet generator" transition while other components may randomly send messages. For example, the timing occurrences of a SCADA sending messages may be described by a Poisson law when it corresponds to a user request and by a uniform distribution when it corresponds to a refresh request. Finally, the substitution transition "component behaviour" contains the specific internal behaviour of each component.

Now referring to FIG. 6, further possible steps are shown setting out the method of FIG. 2 in more detail. The step of instantiating 107 the basic Petri Net model by processing the component parameter list may include generating 203 an initial token in the architecture place. The processing of the component parameter list then includes, for each family present in the component parameter list, generating 204 family instantiation tokens in each family place. In this manner, a family place gets instantiated when a token is generated there, which may be referred to as an instantiated family. Processing the component parameter list further includes, for each component in the component parameter list, generating 205 a component instantiation token in the component place of each instantiated family. And processing the component parameter list includes assigning the respective component parameter data as the colour of the parameterisation tokens for the component model.

In order to ensure that the various tokens are assigned with the proper values i.e. colour, colour sets are declared in advance for the tokens by a Petri Net expert. Accordingly, as shown in FIG. 6, the method further may include providing 201 colour sets declared for the component place, the colour set having an identification number, a component specification, and a family association.

And further providing 202 a colour set declared for a communication token of the component model, the: colour set having a source identifier; a destination identifier; a sequence number; data size; and a time stamp.

The method as described above is in particular apt for automatic generation of a Petri Net simulation model of an Industrial Control System, as it may benefit of pre-processed component parameter lists provided as an ML function. Such an ML function may be generated from an XML description of the architecture of the ICS model. Programs for designing an ICS are generally available and are usually capable of exporting an XML file. The conversion of an XML file to a ML function is known in the prior art, such as an XML parser like e.g; Miscrosoft .NET XmlReader or Java JDOM Parser. These use programming language such as JAVA or C# able to parse an XML file and generate a String output, which will be the ML function.

Figure 7:
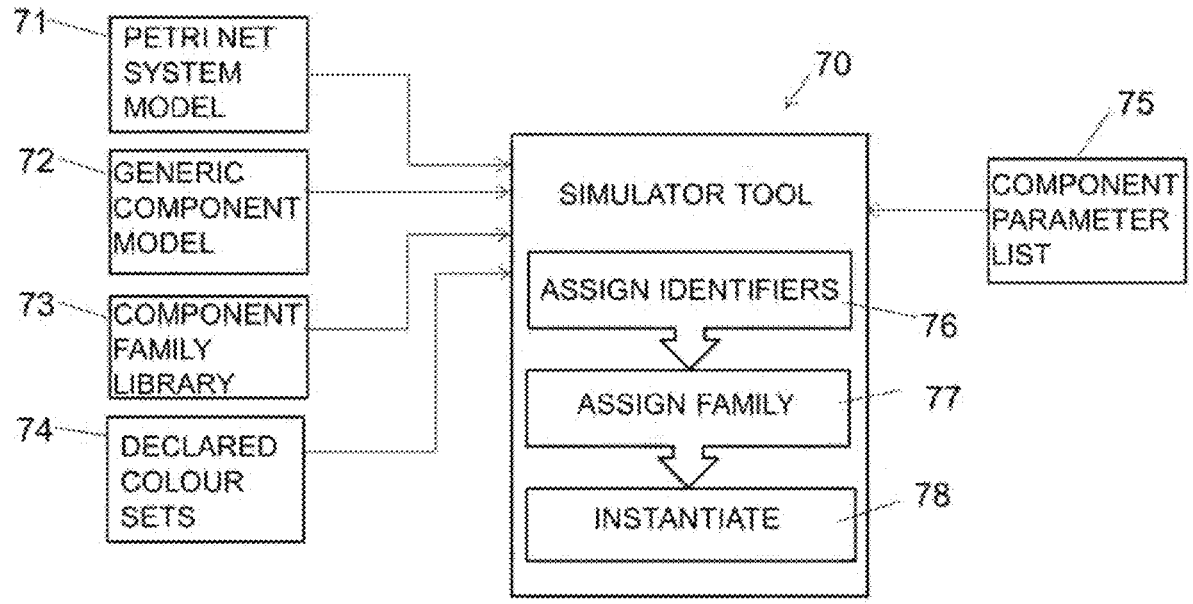
FIG. 7 illustrates schematically an overview of a simulation tool setup in accordance with the invention.

Referring to FIG. 7 a set up of a simulator tool 70 is shown. The parts and libraries provided to the simulator tool 70 that may be provided as separate element and prepared in advance by a Petri Net expert are the Petri Net system model 71, the generic component model 72, the component family library 73 and the declared colour sets 74. These are loaded and configured by the simulator tool. The component parameter list 75 may be retrieved from an external ICS-design tool. With these parts and libraries provided the simulator tool 70 can perform assigning identifiers 76, assigning family associations 77, and instantiate the Perti Net model for simulating the ICS-design. Providing modified versions of the component parameter list 75 representing modifications of the ICS-design, allows repetitive simulation of ICS-design modifications. Accordingly, an ICS-designer may easily obtain the results of simulation and adapt and modify the ICS-design to seek further optimisation of the ICS-design.

Figure 8:
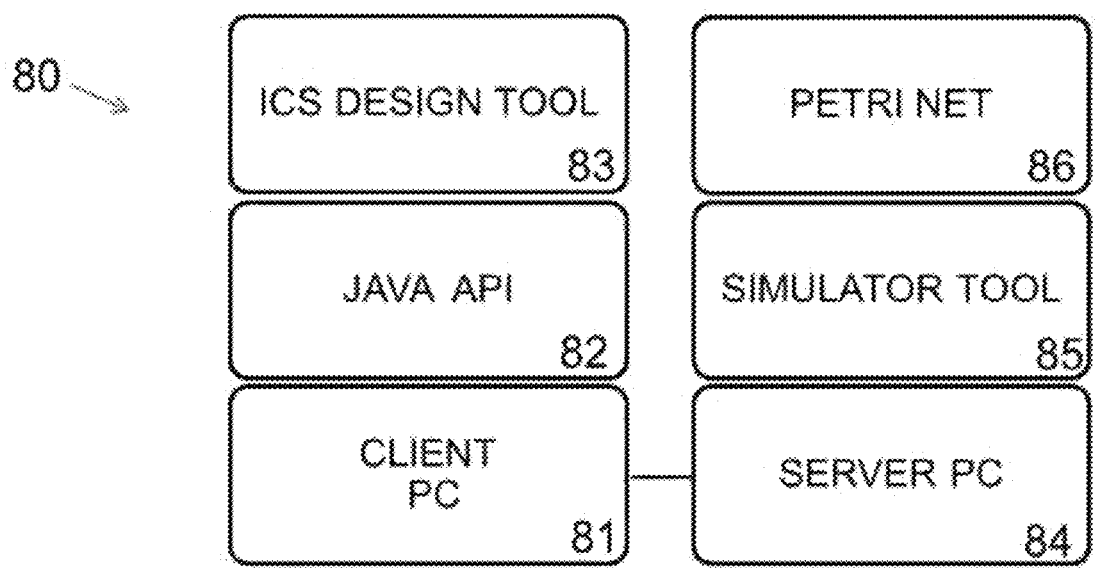
FIG. 8 illustrates schematically an example of a client-server setup.

The set up of the simulator tool as described above, may be executed on a server pc whereas the ICS-designer may execute a design program on a client PC. An example of such a server-client set up is shown in FIG. 8. The design tool 83 for designing an industrial control system is run on the client 81. When the design is ready, an XML file is exported by the tool 83 and converted by a JAVA API (Application Programming Interface) 82 to an ML function. The string of the ML function is send to the server 84 where it is loaded into the simulator tool 85. The simulator tool 85 than configures and instantiates the Petri Net 86 in order to simulate the Petri Net and obtain a performance assessment.

Referring to FIG. 3, the instantiation process is explained in more detail. When the component parameter list, e.g. in the format of a ML function, is processed, the ML function is split up in different parts These parts of the ML function are assigned as functions to the arcs leading from a transition to a place. For example, part of the ML function is assigned to the transition 27 to the family places 23, 28, 30. Hence, the arcs from the transitions 27, 33, 32, 34 may be assigned with parts of the ML function, named e.g. init_archi( ), init_family( ) and init_component( ) and successively instantiate the family and components involved in the ICS architecture. Once these instantiations have been processed, within the substitution transition 44, an init_parameters( ) ML function parameterizes instantiated components based on their specifications, which are specific internal features such as periodic time scan, parameters of the probability distribution.

Thus, when the component parameter list is processed, an initial token 26 is generated in the architecture place 25. The blank token 26 will move to transition 27 and trigger family instantiation tokens 24, 29, 31 in the family places 23, 28, 30. The function of the corresponding arc will assign the colour set and colours to the tokens, becoming family instantiation tokens. Next, the family instantiation token 24 will in turn move to transition 32 and trigger component instantiation token 22 in component place 21. Likewise, family instantiation token 29 will in turn move to transition 33 and trigger component instantiation token 36 in component place 35.

In the example of FIG. 3, the family token 24 may represent a PLC family, whereas the family token 31 represents a SCADA family. The family token 29 represents a Network family. As a communication network is always part of an industrial control system, this family will always be instantiated. If a particular family is not present in the industrial control system no components thereof will be present in the component parameter list and no family association will be assigned. Hence, no tokens will be generated for that particular family and the family will not be instantiated.

Also shown in the example of FIG. 3, is the possibility of a family place 30 instantiating two components 37, 38. These will be identified by differing values of the parameter describing the functional behaviour of the respective component and when the Petri Net model is loaded and configured, multiple component places will be created.

With the family instantiation tokens and component instantiation tokens present in respective the family places and component places, the initial marking of the Petri Net is obtained. Which allows simulation of the ICS-model to be performed.

As pointed out above, inside each generic model of a component able to initiate a communication there is a Packet generator in the form of a packet generator transition 64 and a packet generator place 65. These packet generators of all instantiated components (such as the Network, PLCs, SCADA clients and/or I/O devices) will generate the communication token based on the ID of the component generating the token, the ID of the component to receive the token, and on the time stamp when the token is generated. ID information is retrieved from the colour of the component instantiation token, and the time stamp is retrieved from the simulator time. As each instantiated component has its' own unique ID identifier, this ID allows to differentiate the token during the communication process.

These communication tokens are a Petri Nets representation of packets usually sent by ICS components. A packet in an ICS architecture using an Ethernet-network contains at least the ID of the sender, the ID of the receiver, the sequence number, and the information to be sent. The representation of this packet as a communication token using Petri nets is done by associating a colour representing the ID of the token sender, a colour for the ID of the token receiver, a colour for the sequence number also for the size of the packet. For assessing the performance another colour is added to the communication which is the timestamp when token have been generated.

The simulation of the ICS is completed, when all communication tokens have moved to the communication end place 69 of the functional model 60. The observer transition ("assessment transition") 68 now holds all the monitors related to the performance of the particular component family. These may be retrieved from all the observers, providing the performance assessment of the Industrial Control System.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A computer-implemented method for generating a Petri Net simulation model of a particular industrial control system, comprising:
   providing a Petri Net system model including a component model, at least two component places for generating parameterization tokens for the component model in response to component instantiation tokens, at least two family places for generating component instantiation tokens for the at least two component places in response to family instantiation tokens, and an architecture place for generating family instantiation tokens for the at least two family places in response to an initial token;
   providing a component family library comprising component family data for at least a network family, and for one or more of a supervisory control and data acquisition (SCADA) family, a Programmable Logic Controller (PLC) family, and an I/O devices family;
   providing a component parameter list comprising component parameter data for each individual component of the particular industrial control system;
   assigning a unique identifier to each component of the component parameter list;
   assigning each component present in the component parameter list to one component family of the component family library;
   instantiating the Petri Net model by processing, using processing circuitry, the component parameter list so as to stimulate the particular industrial control system and generate a performance assessment of the particular industrial control system; and
   outputting the generated assessment of the particular industrial control system.

2. The method according to claim 1, further comprising providing a color set declared for the component place, the color set including an identification number, a component specification, and a family association.

3. The method according to claim 1, further comprising providing a color set declared for a communication token of the component model, the color set including a source identifier, a destination identifier, a sequence number a data size, and a time stamp.

4. The method according to claim 1, wherein the component model comprises: a first component place, a functional block, an input place, an output place, a received message place and a send message place, an input buffer connected between the received message place and the input place, and an output buffer connected between the send message place and the output place.

5. The method according to claim 1, wherein the step of instantiating the Petri Net model by processing the component parameter list comprises generating an initial token in the architecture place.

6. The method according to claim 1, wherein the step of instantiating the Petri Net model by processing the component parameter list comprises, for each family present in the component parameter list, generating an instantiation token in each family place.

7. The method according to claim 1, wherein the step of instantiating the Petri Net model by processing the component parameter list further comprises, for each component in the component parameter list, generating a parameterization token in the component place of each instantiated family; and
   assigning the respective component parameter data as a color of the parameterization token for the component.

8. The method according to claim 1, wherein the component parameter list is provided as an ML function.

9. The method according to claim 8, wherein the ML function is generated from an XML description of the particular industrial control system.

10. The method according to claim 1, wherein the component family data comprises, for each component family, a functional behavior description, and a set of default parameter values.

11. A non-transitory computer-readable medium storing a program that, when executed by the processing circuitry, causes the processing circuitry to perform the method according to claim 1.

12. An apparatus for generating a Petri Net simulation model of a particular industrial control system, the apparatus comprising:
    processing circuitry configured to
       provide a Petri Net system model including a component model, at least two component places for generating parameterization tokens for the component model in response to component instantiation tokens, at least two family places for generating component instantiation tokens for the at least two component places in response to family instantiation tokens, and an architecture place for generating family instantiation tokens for the at least two family places in response to an initial token;
       provide a component family library comprising component family data for at least a network family, and for one or more of a supervisory control and data acquisition (SCADA) family, a Programmable Logic Controller (PLC) family, and an I/O devices family;
       provide a component parameter list comprising component parameter data for each individual component of the particular industrial control system;
       assign a unique identifier to each component of the component parameter list;

assign each component present in the component parameter list to one component family of the component family library;

instantiate the Petri Net model by processing, using processing circuitry, the component parameter list so as to stimulate the particular industrial control system and generate a performance assessment of the particular industrial control system; and output the generated assessment of the particular industrial control system.

* * * * *